United States Patent
Shi (10) Patent No.: US 10,674,706 B2
(45) Date of Patent: Jun. 9, 2020

(54) FAST-WEARING GRADE-POSITIONING WOUND-EXPOSED MULTIFUNCTIONAL ANIMAL EAR TAG

(71) Applicant: BEIJING MJIANG TECHNOLOGY CO., LTD., Beijing (CN)

(72) Inventor: Baoqin Shi, Beijing (CN)

(73) Assignee: BEIJING MJIANG TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/259,378

(22) Filed: Jan. 28, 2019

(65) Prior Publication Data

US 2019/0350168 A1 Nov. 21, 2019

(30) Foreign Application Priority Data

| May 15, 2018 | (CN) | 2018 1 0455420 |
| May 15, 2018 | (CN) | 2018 2 0714791 U |
| Dec. 4, 2018 | (CN) | 2018 1 1470995 |
| Dec. 4, 2018 | (CN) | 2018 2 2026579 U |

(51) Int. Cl.

| *G06K 19/077* | (2006.01) |
| *A01K 11/00* | (2006.01) |
| *A01K 29/00* | (2006.01) |
| *G06K 19/00* | (2006.01) |
| *G06K 19/06* | (2006.01) |

(52) U.S. Cl.
CPC ......... *A01K 11/004* (2013.01); *A01K 29/005* (2013.01); *G06K 19/07749* (2013.01)

(58) Field of Classification Search
CPC ........ G06K 19/00; G06K 19/04; G06K 19/06; G06K 19/07
USPC ................................ 235/492, 487, 380, 375
See application file for complete search history.

(56) References Cited

U.S. PATENT DOCUMENTS

| 2013/0074607 A1* | 3/2013 | Jin ........................... G01N 3/20 |
| | | 73/849 |
| 2014/0097940 A1* | 4/2014 | Kwak .................. A22B 5/0064 |
| | | 340/10.1 |

FOREIGN PATENT DOCUMENTS

| CN | 106305476 A | 1/1917 |
| CN | 206895526 U | 1/1918 |
| CN | 107751014 A | 3/1918 |

* cited by examiner

*Primary Examiner* — Edwyn Labaze
(74) *Attorney, Agent, or Firm* — Charles C. Achkar; Ostrolenk Faber LLP.

(57) ABSTRACT

Described herein is a fast-wearing grade-positioning wound-exposed multifunctional animal ear tag that includes a primary tag, a secondary tag, an UHF RFID chip, a half-duplex ULF RFID chip, an ambient temperature sensor, an animal body temperature sensor, a fast-wearing grade-positioning pin, and a bearing clamp. The ear tag measures animal ear root temperature and ambient temperature of a place where the animal resides. An ointment may be placed onto the UHF RFID chip, the half-duplex ULF RFID chip, and the ear tag in order to facilitate rapid wound healing.

10 Claims, 8 Drawing Sheets

FIG. 10

FAST-WEARING GRADE-POSITIONING WOUND-EXPOSED MULTIFUNCTIONAL ANIMAL EAR TAG

FIELD OF THE INVENTION

The present invention generally relates to an animal ear tag, and more particularly to a multifunctional animal ear tag with a fast-wearing and grade positioning feature and capable of exposing the animal's wound, measuring the animal's ear temperature and the ambient temperature, and containing an ultra-high frequency radio frequency identification (UHF RFID) chip and a half-duplex ultra-low frequency radio frequency identification (half-duplex ULF RFID) chip.

BACKGROUND OF THE INVENTION

At present, there are various types of animal ear tags available in the market, and improvements are made according to the functions of the ear tags as follows:

Prior Art 1: P.R.C. Pat. Application No. 201610690888.5 discloses a radio frequency identification (RFID) animal ear tag comprising a bottom platform, and a cover coupled to a lower platform through a connecting part, and the lower platform has a layer of conductive wire manufactured on a substrate by silk screen printing or etching, and an electronic tag chip is mounted onto the lower platform and coupled to the conductive wire, and the cover has a signal transmitter installed thereon and coupled to the electronic tag chip through the conductive wire and coupled to a signal booster. The present invention has the advantage of enhancing the signal of the electronic tag to achieve a long-distance data transmission and reducing the level of difficulty of obtaining the electronic tag data.

Prior Art 2: R.O.C. Pat. Application No. 201720750758.6 discloses an animal ear tag which relates to the field of livestock farming and comprises a primary tag, a tag neck and a secondary tag, and the secondary tag is coupled to the primary tag through the tag neck, and the tag neck is coupled to the a primary tag thread, and the junction of the primary tag and the tag neck has a ring-shaped latch slot, and the tag neck has a ring-shaped waterproof ring sheathed thereon, and the waterproof ring is latched to the ring-shaped latch groove, and the primary tag has a waterproof cover sheathed thereon, and the waterproof cover has a strip gap formed thereon, and the gap has a plastic sealing strip disposed thereon, and an end of the tag neck has a connecting base, and the connecting base has a semicircular latch member installed thereon, and a spring is installed between the latch member and a sidewall of a connecting base, and the primary tag has a through hole formed thereon, wherein the through hole is in a round table shape, and the primary tag has a GPS chip installed therein, and the primary tag further has a microchip and a QR code tag installed thereon. In this invention, the edge of the ear tag is installed securely and will not fall off easily. This invention has a waterproof function to improve the reliability of using the ear tag outdoor and a practical value.

Prior Art 3: R.O.C. Pat. Application No. 201610689945.8 discloses an animal ear tag with an alarm function, and the animal ear tag comprises a primary tag, a secondary tag a cover having a latch leg, an ear tag head installed on a back side of the primary tag, wherein the ear tag head is a conical structure, and the bottom of the ear tag head has a ring-shaped groove, and the ear tag head is embedded into the secondary tag, and the latch leg of the cover is latched into the groove, and the cover is locked and secured with the secondary tag, and the front side of the primary tag has a chip mounting slot formed thereon, and the chip mounting slot has an electronic recognizer installed therein, and the outer side of the electronic recognizer is covered by an apron, a latch slot is formed on the inner wall of the chip mounting slot and disposed on the outer side of the apron, and the packaging plastic is disposed on an opening of the chip mounting slot and latched into the latch slot; and the electronic recognizer comprises a storage chip, a wireless transmission module and an encoder, and the storage chip is coupled to a wireless transmission module through an encoder, and the ear tag neck has an alarm and a controller installed thereon. This invention has the features of simple structure and convenient use.

In summation, the prior arts above have not disclosed a fast-wearing grade-positioning multifunctional animal ear tag in accordance with the present invention, and the present invention comes with a simple structure and a multiple of functions which are pursued by those skilled in the art.

In view of the aforementioned drawbacks of the prior art, the inventor of the present invention based on years of experience in the related industry to conduct extensive research and experiment, and finally provided a feasible solution to overcome the drawbacks of the prior art.

SUMMARY OF THE INVENTION

Therefore, it is a primary objective of the present invention to overcome the aforementioned drawbacks of the prior art by providing an ear tag with fast grade-positioning according to the thickness of the animal ear, exposing the animal wound, and detecting the animal's body temperature, and the ambient temperature of a place where the animal resides.

To achieve the aforementioned objective, the present invention provides a fast-wearing grade-positioning wound-exposed multifunctional animal ear tag comprising a primary tag 1, a secondary tag 2, an UHF RFID chip 5, an ambient temperature sensor 6, an animal body temperature sensor 7, a fast-wearing grade-positioning pin 3, and a bearing clamp 4. The primary tag 1 comprises a primary tag casing 11, a primary tag cover 12, a primary tag grade positioning pin column 18 disposed at an outer edge of the primary tag casing 11, and the primary tag grade positioning pin column 18 has a center opening 181 for exposing the wound of the animal ear as much as position after the fast-wearing grade-positioning pin 3 is passed. The secondary tag 2 comprises a secondary tag casing 21, a secondary tag grade positioning pin hole 23 formed on the secondary tag casing 21, and a fast-wearing pin protecting column 24 formed in and extending from the outer side of the secondary tag grade positioning pin hole 23; the fast-wearing grade-positioning pin 3 passes through the primary tag grade positioning pin column 18 and the secondary tag grade positioning pin hole 23 and aligns precisely with the bearing clamp 4 and passes into the fast-wearing pin protecting column 24 for a fixed connection, and a side of the primary tag casing 11 opposite to the secondary tag 2 has a primary tag buffer silicone pad 8, and a side of the secondary tag casing 21 opposite to the primary tag 1 has a secondary tag buffer silicone pad 9.

In the fast-wearing grade-positioning wound-exposed multifunctional animal ear tag, the primary tag casing 11 and the primary tag cover 12 are sealed into one piece by ultrasonic welding.

In the fast-wearing grade-positioning wound-exposed multifunctional animal ear tag, the fast-wearing grade-positioning pin 3 comes with a quantity of three, and the primary tag pin hole 18 and the secondary tag grade positioning pin hole 23 also come with the quantity of three each and configured to be corresponsive to be each other; and the primary tag grade positioning pin column 18 and the secondary tag grade positioning pin hole 23 are distributed into a triangular shape which is an isosceles right-angled triangular shape or an equilateral triangular shape.

In the fast-wearing grade-positioning wound-exposed multifunctional animal ear tag, both left and right ends of a panel of the primary tag casing 11 have a sensor hole 10 for passing an animal high-precision temperature sensor 7 and a sensor hole 17 formed on the top of an upper casing for passing the ambient temperature sensor 6, and the primary tag casing 11 contains a battery 16, a PCB 13, a mask cover 14, an UHF RFID chip 5, an antenna and bracket 15 installed sequentially therein, and the primary tag casing 11 is covered by the primary tag cover 12.

In the fast-wearing grade-positioning wound-exposed multifunctional animal ear tag, the secondary tag casing 21 has a venting hole 22 formed thereon, and the bottom end of the fast-wearing pin protecting column 24 has a bearing clamp plug 25 installed thereto, and the bottom of the secondary tag casing 21 has a low-frequency RFID module 26 installed thereto, and the exterior of the low-frequency RFID module 26 has a low-frequency RFID cover 27 installed thereto for protecting the low-frequency RFID module.

In the fast-wearing grade-positioning wound-exposed multifunctional animal ear tag, the outer side of the primary tag buffer silicone pad 8 and the outer side of the primary tag casing 11 are matched with each other, and the primary tag buffer silicone pad 8 has a pin hole 81 formed at a position configured to be corresponsive to the primary tag grade positioning pin column 18, and the periphery of the pin hole 81 has a boss 82 formed thereon for placing an ointment, and the contact of the primary tag buffer silicone pad 8 and the animal body temperature sensor 7 has a sensor hole 83 formed thereon, and the outer periphery of the sensor hole 83 has a seal ring 84, and an end of the primary tag buffer silicone pad 8 has a groove 85 provided for installation and positioning.

In the fast-wearing grade-positioning wound-exposed multifunctional animal ear tag, the outer side of the secondary tag buffer silicone pad 9 and the outer side of the secondary tag casing 21 are matched with each other, and the secondary tag buffer silicone pad 9 has a rubber pad venting hole 91, and a relative position of the secondary tag buffer silicone pad 9 and the secondary tag grade positioning pin hole 23 have a small groove 90 formed thereon for placing a soft ointment.

In the fast-wearing grade-positioning wound-exposed multifunctional animal ear tag, the fast-wearing pin protecting column 24 is hollow, and its rear end has a bearing clamp plug 25 for sealing a hole after the bearing clamp 4 is passed through the hole for the installation, or the rear end of the fast-wearing pin protecting column 24 is sealed, and the bearing clamp 4 is fixed into the fast-wearing pin protecting column 24.

In the fast-wearing grade-positioning wound-exposed multifunctional animal ear tag, the ambient temperature sensor 6 is passed through the primary tag casing 11 and coupled to an ADC3 of the PCB 13, and the left and right animal temperature sensors 7 are passed through the primary tag casing 11 and coupled to an ADC1 and an ADC2 of the PCB 13.

In the fast-wearing grade-positioning wound-exposed multifunctional animal ear tag, an end of the fast-wearing grade-positioning pin 3 is a flat nut head 31, and its top has a strong magnet 33, and the other end is a pointed tip, and an end near the flat nut head 31 is a smooth straight rod, and a pin body near the pointed tip has 10~20 parallel threads 32; and the bearing clamp 4 has a ring-shaped tabletop 44, and the ring-shaped tabletop 44 has three or four latch plates 43 disposed along the direction of the center, and the latch plate 43 is tilted by 5~10 degrees along the direction of passing the fast-wearing grade-positioning pin 3, and the latch plates 43 are latched and fixed to the parallel threads 32 respectively.

Compared with the prior art, the present invention has the following advantageous effects: The present invention has three fast-wearing grade-positioning pin distributed in a triangular shape on the upper half of an end surface of the primary tag, and the secondary tag has a fast-wearing female locking column disposed at a corresponding position, so that the ear tag can be secured and will not fall off due to squeezing and collision among animals, and the fast-wearing grade-positioning pin passes through the primary tag, the animal ear, and the secondary tag for a fixation, and the fast-wearing grade-positioning pin passes through the wound of the animal ear to provide a larger air exposed surface to facilitate the ventilation of the wound and to heal early. The contact surface between the primary tag and the animal ear has two sensors installed thereon, one sensor installed at the top of the casing, and the ear contact surface has two sensors installed thereon which are applicable for passing the ear tag through an animal's left ear or right ear, so that a sensor can be installed near to the animal's ear root, and the animal body temperature sensor is combined closely with the animal's body to allow the animal body temperature sensor to be attached tightly with the animal ear root to obtain more accurately measured data; and the sensor installed at the top of the casing can sense the ambient temperature; the contact surface of the primary tag and the animal ear has a silicone pad, and the contact between the primary tag silicone pad and the sensor has a seal ring; and the contact surface of the secondary tag and the animal ear also has a silicone pad which is a secondary tag silicone pad, and the primary tag silicone pad and the secondary tag silicone pad has a small groove for passing through the fast-wearing grade-positioning pin and placing a soft ointment. Before the ear tag is passed through the animal ear, a soft ointment may be coated onto the small groove to protect the wound of the animal ear from being infected by dirty substances, so as to achieve an anti-inflammatory effect; and the ambient temperature sensor is also half-exposed from the top of the upper casing of the primary tag, and the temperature sensor and its related circuit are provided for monitoring the daily health conditions of an animal, the ambient temperature of a place where the animal resides, and other statuses.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

It is noteworthy that the terms indicating a directional or positional relation such as the "top", "bottom", "left", "right", "interior", and "exterior" based on the directional or positional relation as shown in the drawings are simply used to facilitate the description only, and it does not point out or imply that the device or component has to be in a specific direction or a specific position or operated by a specific directional or positional structure, so that these terms are not interpreted as a limitation to the present invention.

In addition, the terms "installed", "coupled", and "connected" should be interpreted in a broad manner unless specified otherwise. For example, the components may be fixedly coupled, detachably coupled, integrally coupled, directly coupled, or indirectly coupled through a medium, or internally communicated with each other. Therefore, people having ordinary skill in the art can interpret the specific meaning of the aforementioned terms according to a specific condition.

Figure 1:
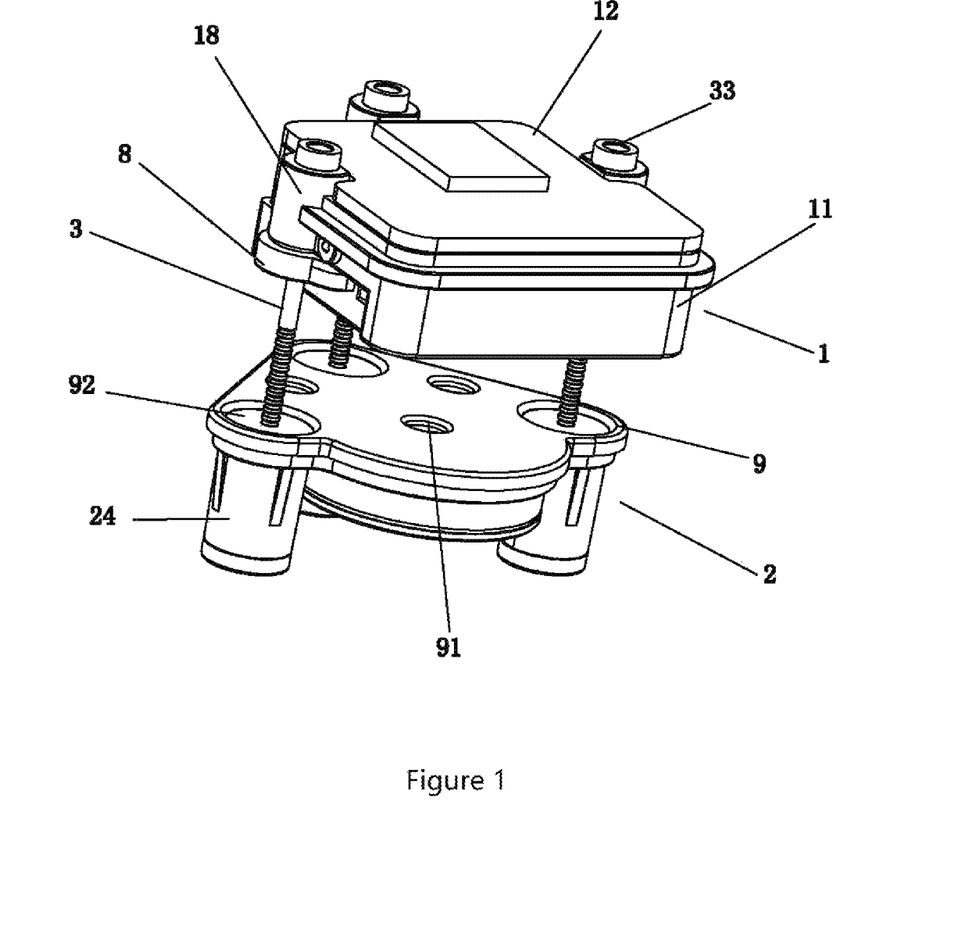
FIG. 1 is a schematic view showing the overall structure of the present invention.
Figure 2:
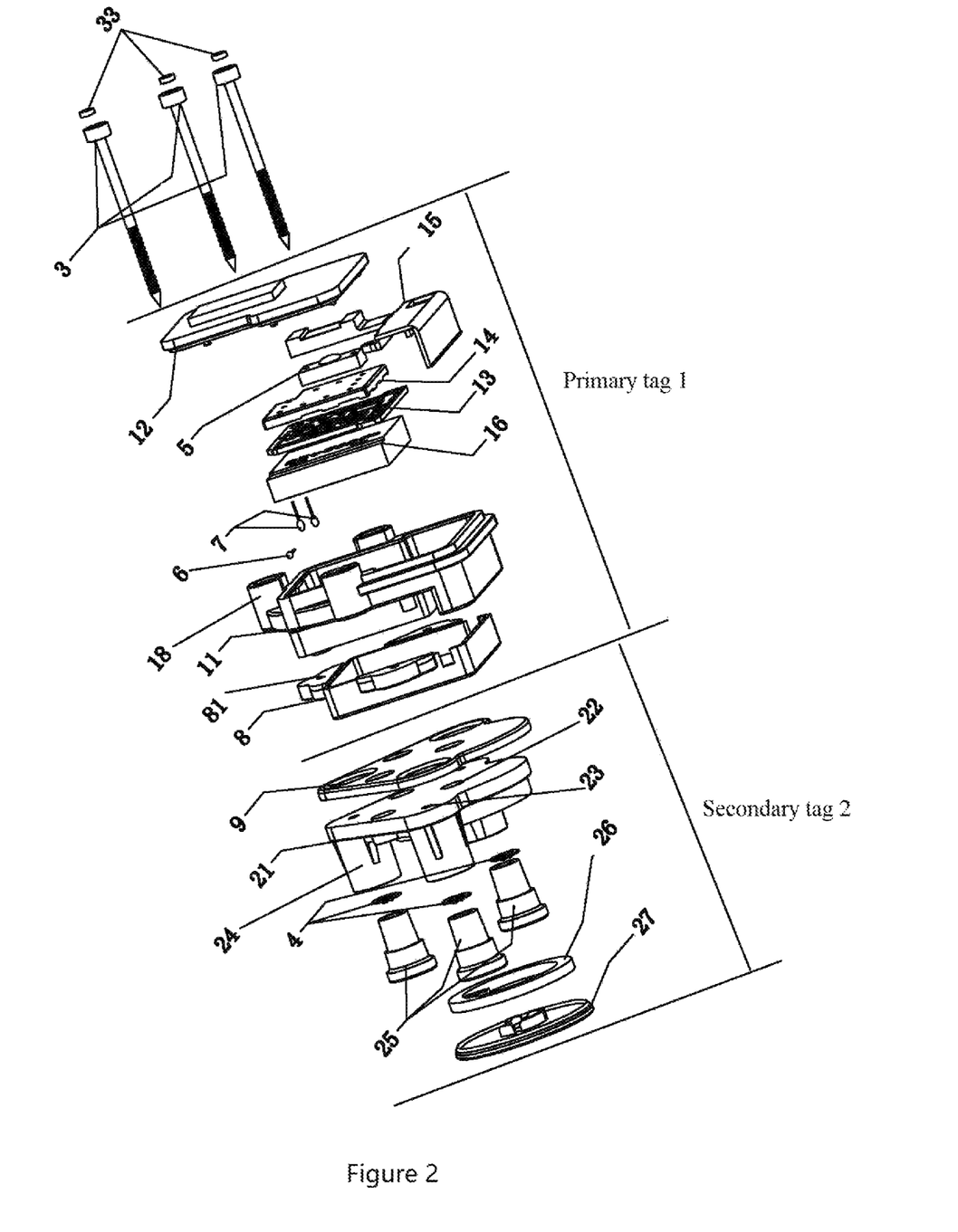
FIG. 2 is a partial exploded view of the present invention.
Figure 3:
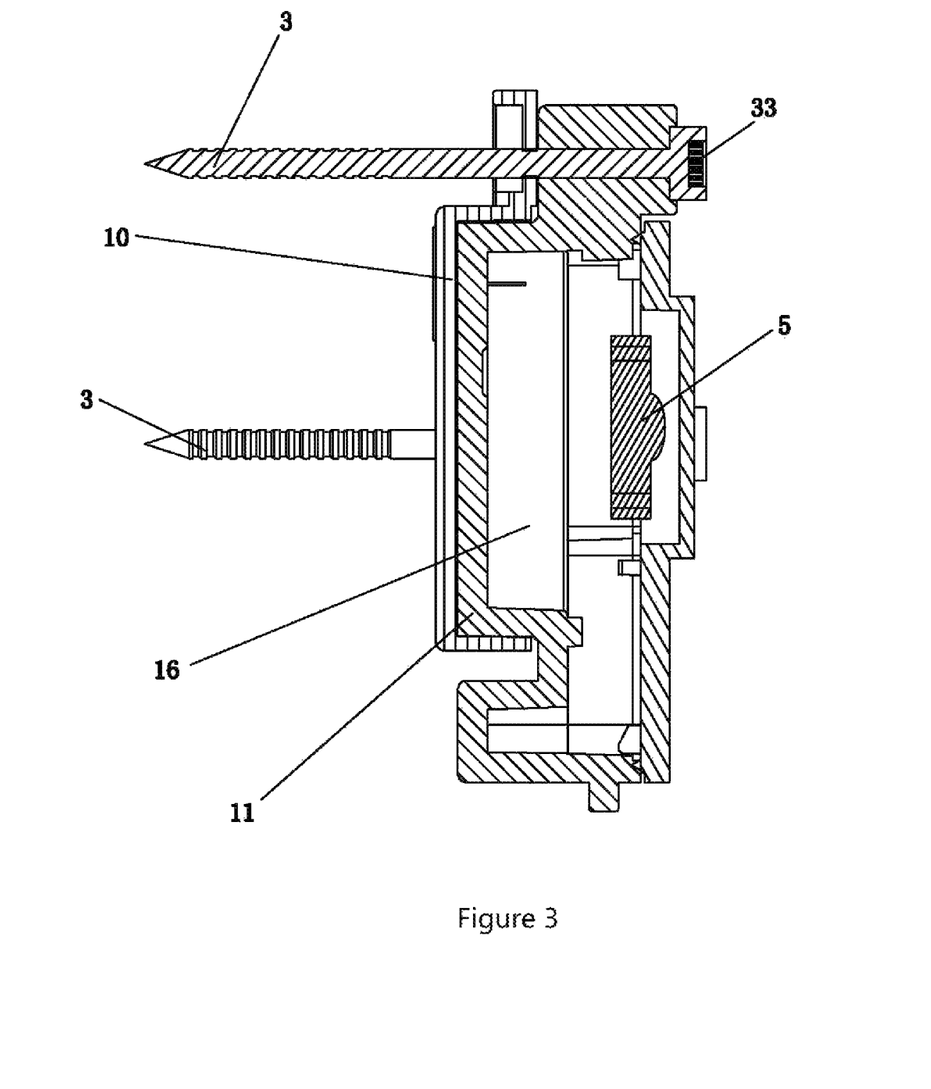
FIG. 3 is a cross-sectional view of a primary tag casing of the present invention.
Figure 3A:
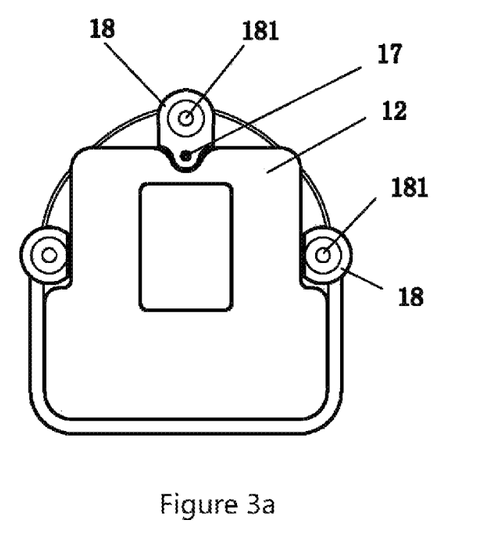
FIG. 3a is an outer-side view of a primary tag casing of the present invention.
Figure 3B:
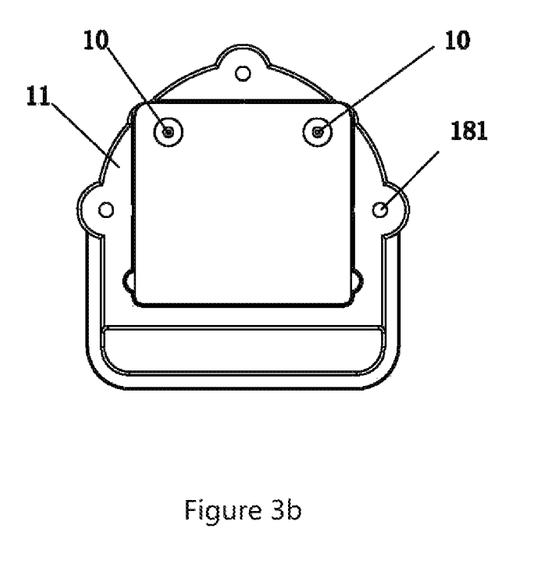
FIG. 3b is an inner-side view of a primary tag casing of the present invention.
Figure 4:
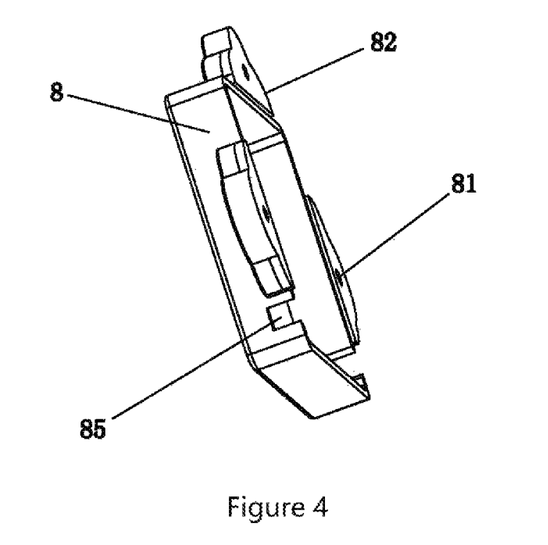
FIG. 4 is a perspective view of a buffer silicone pad of a primary tag of the present invention.
Figure 5:
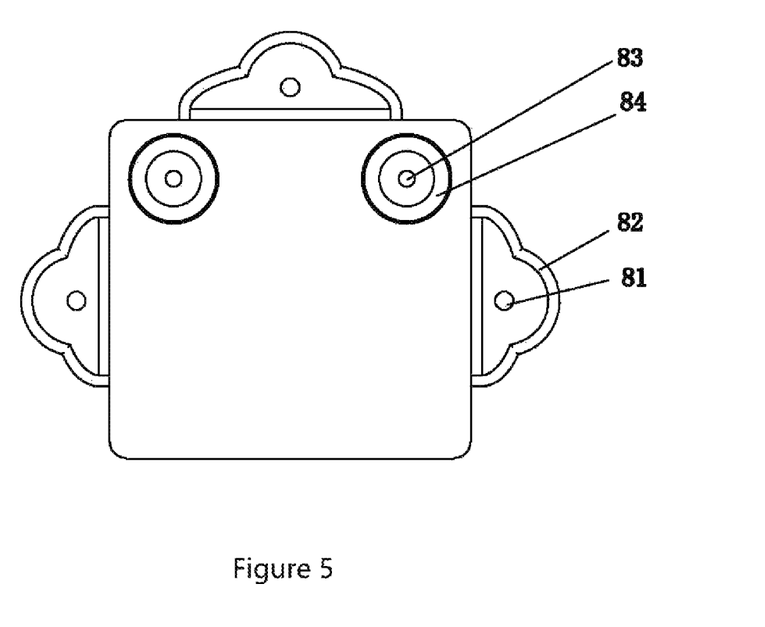
FIG. 5 is a front view of a buffer silicone pad of a primary tag of the present invention.
Figure 6:
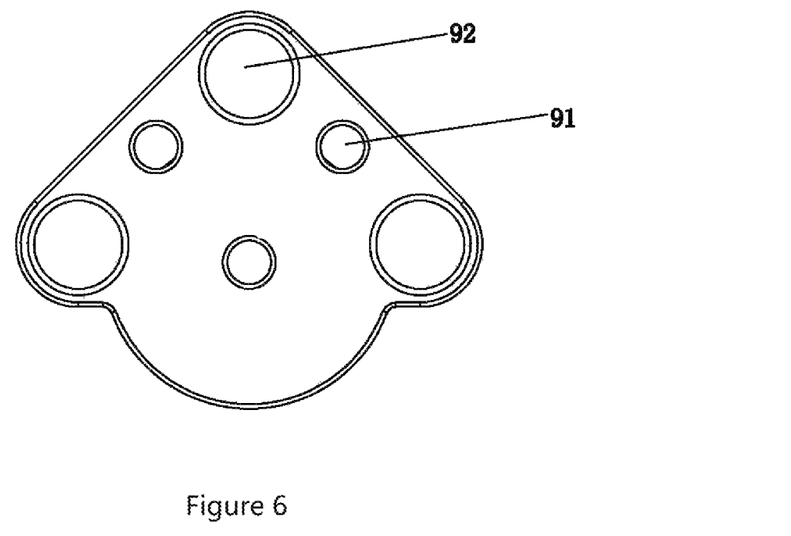
FIG. 6 is a front view of a buffer silicone pad of a secondary tag of the present invention.
Figure 7:
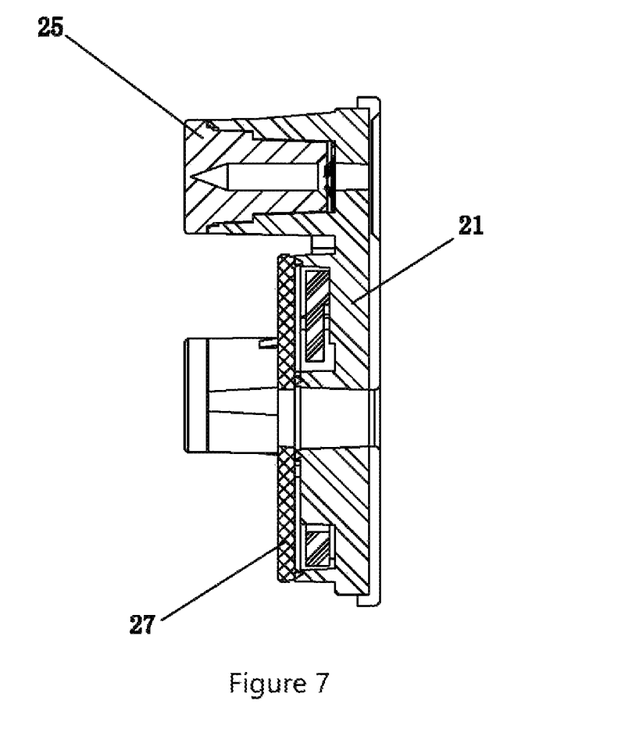
FIG. 7 is a cross-sectional view of a secondary tag of the present invention.

With reference to FIGS. 1 to 7 for a fast-wearing grade-positioning wound-exposed multifunctional animal ear tag in accordance with the present invention, the animal ear tag comprises: a primary tag 1, a secondary tag 2, an ultra-high frequency radio frequency identification (UHF RFID) chip 5, an ambient temperature sensor 6, and an animal body temperature sensor 7, a fast-wearing grade-positioning pin 3, and a bearing clamp 4. The primary tag 1 comprises a primary tag casing 11, a primary tag cover 12, a primary tag grade positioning pin column 18 disposed at an outer edge of the primary tag casing 11, and the primary tag grade positioning pin column 18 has a center opening 181 (as shown in FIG. 3a) provided for exposing the wound of the animal ear as much as possible when the fast-wearing grade-positioning pin 3 is passed through the animal ear. The secondary tag 2 comprises a secondary tag casing 21, a secondary tag grade positioning pin hole 23 formed on the secondary tag casing 21, and the secondary tag grade positioning pin hole 23 has a fast-wearing pin protecting column 24 extending from an outer surface thereof. The fast-wearing grade-positioning pin 3 passes through the primary tag grade positioning pin column 18 and the secondary tag grade positioning pin hole 23, aligns with the bearing clamp 4, passes into the fast-wearing pin protecting column 24 to achieve the latching and fixing effects. A side of the primary tag casing 11 relative to the secondary tag 2 has a primary tag buffer silicone pad 8, and a side of the secondary tag casing 21 relative to the primary tag 1 has a secondary tag buffer silicone pad 9. The primary tag casing 11 and the primary tag cover 12 are sealed as a whole by ultrasonic welding. There are three fast-wearing grade-positioning pins 3, and there are three primary tag pin holes 18 and three secondary tag pin holes 28, and they are configured to be corresponsive to one another. The primary tag grade positioning pin column 18 and the secondary tag grade positioning pin hole 28 are distributed in a triangular shape which is an isosceles right-angled triangular shape or an equilateral triangular shape. Both ends of a panel of the primary tag casing 11 have one sensor hole 10 provided for passing through the high-precision animal temperature sensor 7, and a hole 17 (as shown in FIG. 3a) formed at a portion of the top of the primary tag casing 11 and provided for passing through the ambient temperature sensor, and the primary tag casing 11 contains a battery 16, a PCB 13, a mask cover 14, an UHF RFID chip 5, ab antenna and bracket 15 sequentially installed therein, and finally the primary tag casing 11 is covered by the primary tag cover 12. The secondary tag casing 21 has a venting hole 22 formed thereon, and the bottom end of the fast-wearing pin protecting column 24 has a bearing clamp plug 25 disposed thereon, and the bottom of the secondary tag casing 21 has a low-frequency RFID module 26 installed thereto, and the exterior of the low-frequency RFID module 26 has a low-frequency RFID cover 27 for protecting the low-frequency RFID module. The primary tag buffer silicone pad 8 has an outer side match with the outer side of the primary tag casing 11, and the relative position of the primary tag buffer silicone pad 8 and the primary tag grade positioning pin column 18 has a pin hole 81 formed thereon, and a boss 82 is formed at the periphery of the pin hole 81 for placing an ointment, and the contact between the primary tag buffer silicone pad 8 and the animal body temperature sensor 7 has a sensor hole 83 formed thereon, and the outer periphery of the sensor hole 83 has a seal ring 84, and an end of the primary tag buffer silicone pad 8 has a groove 85 formed at an end thereof for installation and fixation. The secondary tag buffer silicone pad 9 has an outer side matched with the outer side of the secondary tag casing 21, and the secondary tag buffer silicone pad 9 has a rubber pad venting hole 91, and a relative position of the secondary tag buffer silicone pad 9 and the secondary tag grade positioning pin hole 23 has a small groove 92 for placing a soft ointment. The fast-wearing pin protecting column 24 is hollow, and its rear end has a bearing clamp plug 25 for sealing a hole after the bearing clamp 4 is passed through for installation, or the rear end of the fast-wearing pin protecting column 24 is sealed, and the bearing clamp 4 is fixed and installed in the fast-wearing pin protecting column 24.

Figure 8:
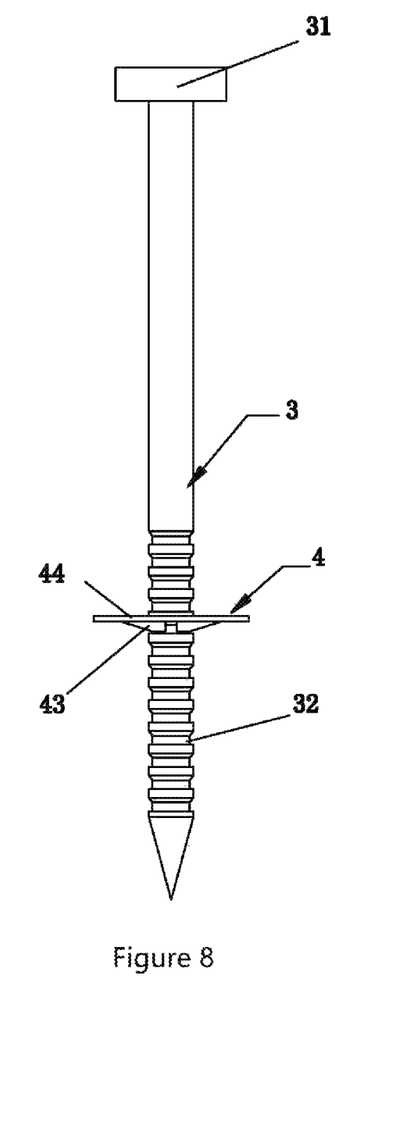
FIG. 8 is a schematic view of a fast-wearing grade-positioning pin assembled with a bearing clamp in accordance with the present invention.
Figure 9A:
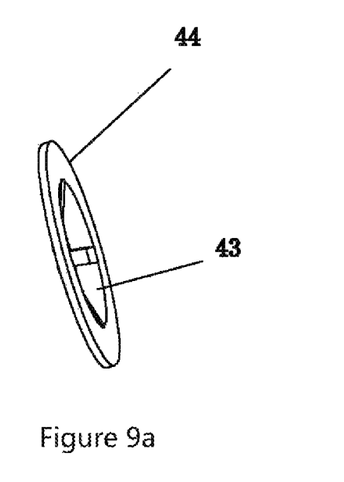
FIG. 9a is a perspective view of a bearing clamp of the present invention.
Figure 9B:
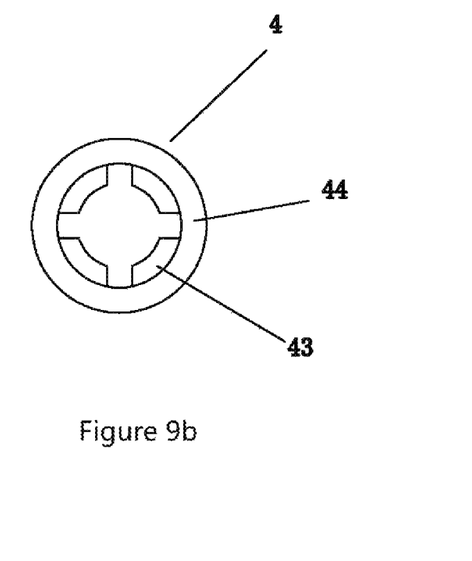
FIG. 9b is a front view of a bearing clamp of the present invention.

In FIG. 8, (wherein the strong magnet 33 is omitted in this figure), the fast-wearing grade-positioning pin 3 has an end being a flat nut head 31 and the other end being a pointed tip, and an end near the flat nut head 31 is a smooth straight rod, and a pin body near the pointed tip has 10~20 parallel threads 32. Preferably, 15 parallel threads 32 are used. In FIGS. 9a and 9b, the bearing clamp 4 has a ring-shaped tabletop 44, and there are three or four latch plates 43 disposed along the direction of the center of the ring-shaped tabletops 44, and the latch plates 43 are tilted by 5~10 degrees along the direction of passing the fast-wearing grade-positioning pin 3, so as to fix the latch plates 43 into the grooves of the parallel threads 32 securely, and prevent the fast-wearing grade-positioning pin 3 from being withdrawn in an opposite direction. If it is necessary to remove the ear tag, the bearing clamp 4 must be damaged before the fast-wearing grade-positioning pin 3 can be removed.

Figure 10:
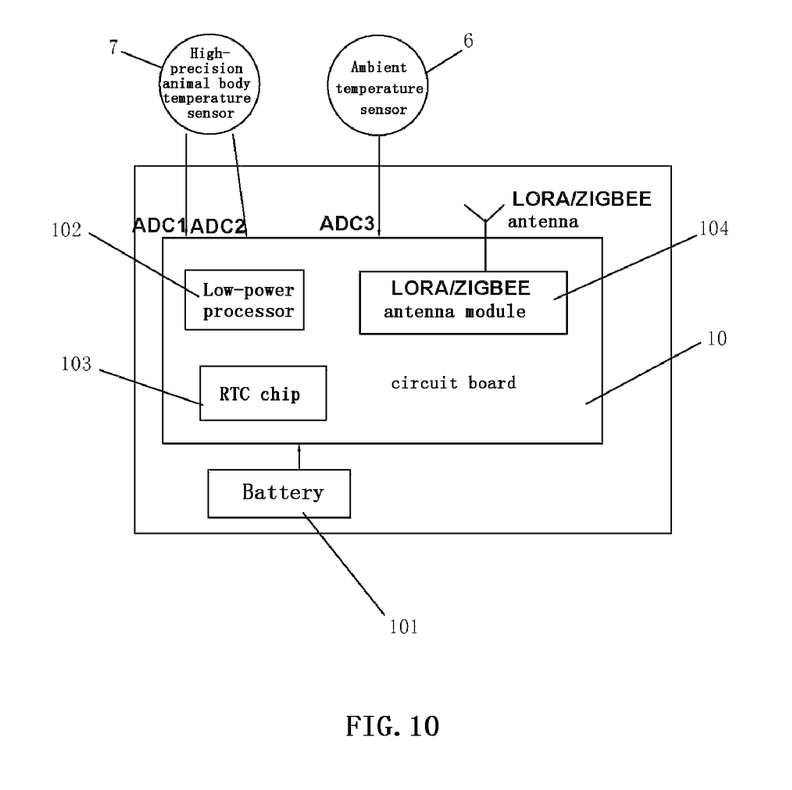
FIG. 10 is a schematic circuit block diagram of a circuit installed in a lower casing of a primary tag of the present invention.

With reference to FIG. 10 for a schematic circuit block diagram of a circuit installed in a primary tag cover 12 of the present invention, the ambient temperature sensor 6 is passed through the lower casing of the primary tag cover 12 and coupled to an ADC3 of the circuit board 10, and both left and right animal temperature sensors 7 are passed through the lower casing of the primary tag cover and an ADC1 and an ADC2 of the circuit board 10. The circuit board 10 comprises an ultra-low power processor 104, a LORA/ZIGBEE wireless module 102, a RTC chip 103, a button battery 101 for supplying a working power to the circuit board 10 installed thereon. It is noteworthy that the UHF RFID chip 5 adopted in the present invention is provided by Peking Square Card Intelligence Company, the ambient temperature sensor 6 and ear tag temperature sensor 7 are JTD503F395D12087N-8 sensors provided by Dongguan Amycom Electronics Co., Ltd., the LORA/ZIGBEE wireless module 102 is SEMTECH SX127, the LORA/ZIGBEE antenna is provided by Shenzhen Skyway Technology, Co., the ultra-low power processor 104 is ATMEL AT89C5131A-L, the RTC chip 103 is Micro AM18X5, and the button battery 101 is a CP502425 disposable soft pack battery provided by Wuhan Fanso Technology Co., Ltd.

While the present invention has been described by means of specific embodiments, numerous modifications and variations could be made thereto by those skilled in the art without departing from the scope and spirit of the present invention set forth in the claims.

What is claimed is:

1. A fast-wearing grade-positioning wound-exposed multifunctional animal ear tag, comprising: a primary tag, a secondary tag, an ultra-high frequency (UHF) radio frequency identification (RFID) chip, an ambient temperature sensor, an animal body temperature sensor, a fast-wearing grade-positioning pin, a bearing clamp, and a half-duplex ultra-low frequency (ULF) radio frequency identification (RFID) chip, characterized in that the primary tag comprises a primary tag casing, a primary tag cover, and a primary tag grade positioning pin column disposed at an outer edge of the primary tag casing, wherein when the fast-wearing grade-positioning pin passes through a center opening of the primary tag grade positioning pin column, the animal ear wound may be exposed as much as possible; the secondary tag comprises a secondary tag casing, a secondary tag grade positioning pin hole formed on the secondary tag casing, and a fast-wearing pin protecting column formed on and extending from an outer side of the secondary tag grade positioning pin hole; the fast-wearing grade-positioning pin passes through the primary tag grade positioning pin column and the secondary tag grade positioning pin hole and aligns with the bearing clamp and passes into the fast-wearing pin protecting column for a fixed connection, and a side of the primary tag casing opposite to the secondary tag has a primary tag buffer silicone pad, and a side of the secondary tag casing opposite to the primary tag has a secondary tag buffer silicone pad.

2. The fast-wearing grade-positioning wound-exposed multifunctional animal ear tag according to claim 1, wherein the primary tag casing and the primary tag cover are sealed into one piece by ultrasonic welding.

3. The fast-wearing grade-positioning wound-exposed multifunctional animal ear tag according to claim 1, wherein the fast-wearing grade-positioning pin comes with a quantity of three, and the primary tag grade positioning pin column also comes with a quantity of three and the three primary tag grade positioning pin column are configured to be corresponsive to the three secondary tag grade positioning pin holes respectively; and the primary tag grade positioning pin columns and the secondary tag grade positioning pin holes are distributed in a triangular shape, which is an isosceles right-angled triangular shape or an equilateral triangular shape.

4. The fast-wearing grade-positioning wound-exposed multifunctional animal ear tag according to claim 1, wherein the primary tag casing has a temperature sensor hole formed on both left and right ends of a panel thereof and provided for passing the high-precision temperature sensor to achieve the effect of randomly selecting an animal's left ear or right ear, and both having a sensor installed at a position near the animal's ear root to ensure the accuracy of sensing the ear root temperature; a sensor hole formed at the top of an upper casing for passing an ambient temperature sensor which is provided for monitoring an environmental problem around the animal and providing accurate ear root temperature and ambient temperature to an algorithm to calculate the animal's actual body temperature accurately, and the primary tag casing contains a battery, a printed circuit board PCB, a mask cover, an UHF RFID chip, an antenna and bracket, and is covered by the primary tag cover.

5. The fast-wearing grade-positioning wound-exposed multifunctional animal ear tag according to claim 1, wherein the secondary tag casing has a venting hole formed thereon, a bearing clamp plug installed at the bottom end of the fast-wearing pin protecting column, a half-duplex low-frequency RFID module installed at the bottom of the secondary tag casing, and a low-frequency RFID cover installed at the exterior of low-frequency RFID module for the protecting low-frequency RFID module.

6. The fast-wearing grade-positioning wound-exposed multifunctional animal ear tag according to claim 1, wherein the primary tag buffer silicone pad is matched with the outer side of the primary tag casing, and the primary tag buffer silicone pad has a pin hole formed at a position corresponding to the primary tag grade positioning pin column, a boss formed at the periphery of the pin hole for placing an ointment, and the contact between the primary tag buffer silicone pad and the animal body temperature sensor has a sensor hole formed thereon, and the outer periphery of the sensor hole has a seal ring, and an end of the primary tag buffer silicone pad has a groove provided for installation and positioning.

7. The fast-wearing grade-positioning wound-exposed multifunctional animal ear tag according to claim 1, wherein the secondary tag buffer silicone pad has an outer side matched with the outer side of the secondary tag casing, and the secondary tag buffer silicone pad has a rubber pad venting hole formed thereon, and a relative position of the secondary tag buffer silicone pad and the secondary tag grade positioning pin hole has a small groove for placing a soft ointment.

8. The fast-wearing grade-positioning wound-exposed multifunctional animal ear tag according to claim 1, wherein the fast-wearing pin protecting column is hollow and has a bearing clamp plug disposed at a rear end thereof for sealing a hole after the bearing clamp passes through the hole, or the rear end of the fast-wearing pin protecting column is sealed, and the bearing clamp is fixed into the fast-wearing pin protecting column.

9. The fast-wearing grade-positioning wound-exposed multifunctional animal ear tag according to claim 1, wherein the ambient temperature sensor is passed through the primary tag casing and an ADC of the PCB, and the two high-precision animal temperature sensors are passed through the primary tag casing and coupled to an ADC and an ADC of the PCB.

10. The fast-wearing grade-positioning wound-exposed multifunctional animal ear tag according to claim 1, wherein the fast-wearing grade-positioning pin has an end being a flat nut head, and its top has a strong magnet, and the other end is a pointed tip, and an end near the flat nut head is a smooth straight rod, and a pin body near the pointed tip has 10~20 parallel threads; the bearing clamp has a ring-shaped tabletop, and the ring-shaped tabletop has three or four latch plates along the direction of the center, and the latch plate is tilted by 5~10 degrees along the direction of passing through the fast-wearing grade-positioning pin, and the latch plate is latched into the parallel thread for fixation.

* * * * *